UNITED STATES PATENT OFFICE.

LEONHARD OBERHAEUSSER, OF WÜRZBURG, BAVARIA, GERMANY, ASSIGNOR TO A. GROSSENBACH & COMPANY, OF MILWAUKEE, WISCONSIN.

METHOD OF MAKING SOLUBLE BONBONS.

SPECIFICATION forming part of Letters Patent No. 401,657, dated April 16, 1889.

Application filed July 16, 1888. Serial No. 280,086. (No specimens.) Patented in Germany September 12, 1885, No. 34,973.

*To all whom it may concern:*

Be it known that I, LEONHARD OBERHAEUSSER, of Würzburg, in the Kingdom of Bavaria, Germany, have invented certain new and useful Improvements in the Method of Making Soluble Bonbons, (for which I have obtained a patent in Germany, dated September 12, 1885, No. 34,973;) and I do hereby declare that the following is a full, clear, and exact description thereof.

My invention relates to soluble bonbons; and it consists in a method of making the same.

These bonbons are adapted to be very readily dissolved in water or other liquid, and make a beverage adapted for refreshment as well as for medicinal purposes.

Heretofore bonbons have been made by a boiling process with either clear sugar or with sugar and other ingredients mixed therewith, and then the mass was poured out into cold molds, or, if plastic, pressed in such molds; but such bonbons and confections are not readily soluble in water, because in order to retain their shape these ordinary bonbons are necessarily exposed to severe pressure, whereby the interior of the bonbon becomes very solid, and hence will prevent the fluid from readily penetrating thereto, and so, as stated, the article cannot be easily dissolved.

I produce by my method a readily-soluble bonbon flavored with any desired essence, extract, or essential oil, (which will not stand the boiling process referred to,) and which makes a delicious beverage of the general nature of lemonade when dissolved in a glass of water, and proceed as follows: I take powdered sugar and add thereto such essences, extracts, and substances as I prefer in order to give the required flavor, and when they are thoroughly mixed and rubbed together (as by mortar and pestle) and are in powdered form I moisten the same with slightly-diluted alcohol. I pour the mass into exceedingly hot metallic forms or molds and press the top of the contents with a similarly-heated metallic stamp. Inasmuch as the ingredients are in a powdered form after being mixed together, it is necessary to moisten them sufficiently to cause the mass to adhere together while being poured into the molds or forms, and at the same time if the mass were too wet I would not obtain satisfactory results when the mass reached the heated metal surface of the molds, and hence I use alcohol, which, from its volatile nature, is admirably adapted for this purpose. The form or mold and the stamp must be so hot as to cause the sugary mass to begin to melt wherever it is in contact with the hot metal, and I thereby produce a sugar-glazing all over the bonbon, which not only holds the bonbon together in the shape of the mold without compressing the inside of the bonbon, but also protects it from atmospheric influence—such as dampness. As soon as this glazing is accomplished, (which takes a very short time,) I eject the bonbon from the mold in any preferred manner, (as by opening the mold or otherwise,) and thus the heat of the metal cannot penetrate into the interior of the bonbon to solidify it or injure the ingredients of which it is composed, the only effect of the heat on the interior of the bonbon being to dry it to a practically-powdered condition.

In addition I may further protect the bonbons by a covering of suitable paper, (such as thin parchment paper,) though this is not necessary.

Having thus fully described my invention, what I claim as new, and desire to secure by Letters Patent, is—

The hereinbefore-described method of making soluble bonbons, consisting of moistening the powdered sugar and other ingredients with slightly-diluted alcohol, and subjecting the mass to a very slight pressure in metal forms heated sufficiently to cause the contents next to the heated metallic surfaces to melt slightly and form a thin sugar-glazing over the powdered interior of the bonbons, substantially as set forth.

In testimony that I claim the foregoing I have hereunto set my hand at Nuremberg, Middle Franconia and Kingdom of Bavaria, in the presence of two witnesses.

LEONHARD OBERHAEUSSER.

Witnesses:
 ANDREAS KRAUSSER,
 WM. ESSANREIN.